3,145,154
PRODUCTION OF CHLORTETRACYCLINE AND DEMETHYLCHLORTETRACYCLINE
Joseph Jacob Goodman, Nanuet, N.Y., assignor to American Cyanamid Company, Stamford, Conn., a corporation of Maine
No Drawing. Filed Apr. 11, 1962, Ser. No. 186,631
4 Claims. (Cl. 195—80)

This invention relates to the production of chlortetracycline and demethylchlortetracycline (7-chloro-6-demethyltetracycline) by fermentation and more particularly is concerned with an improved method of increasing the ratio of these halogenated antibiotics to the non-halogenated antibiotics tetracycline and demethyltetracycline in the fermentative biosynthesis of these tetracycline antibiotics.

It has been known for some time that microorganisms of the species *Streptomyces aureofaciens*, which produce chlortetracycline in a medium containing chloride ions, also produce small quantities of tetracycline in the same medium. The concomitant production of tetracycline may be objectionable when chlortetracycline is the principal product sought to be produced. Generally, while specification standards permit small quantities of tetracycline to be present in specification quality chlortetracycline, the presence of any sizable quantities of tetracycline is objectionable. Also, the presence of these two antibiotics in any sizable amounts in the fermentation mash involves difficult problems of separation in the refining or extraction procedures. It is possible, of course, to extract the two antibiotics from the fermentation mash and by selective refining procedures to effect a separation of the antibiotics. However, the refining procedures for effecting separation of the antibiotics are not without some difficulty and they usually involve some loss in total antibiotic potency. Moreover, tetracycline, which in those instances where chlortetracycline is the principal product of the fermentation, may be considered a contaminant and is customarily discarded or allowed to degrade since it is generally not present in sufficient quantity to warrant the expense of a separate purification procedure to bring it up to specification standards and this, of course, also entails a loss in total antibiotic potency.

Substantially the same situation prevails in the commercial production of demethylchlortetracycline. Demethylchlortetracycline and demethyltetracycline are members of a new family of tetracycline antibiotics which are described and claimed in United States patent to Jerry Robert Daniel McCormick et al., No. 2,878,289. The demethyltetracyclines therein described are produced by certain mutant strains of *Streptomyces aureofaciens* derived from the chlortetracycline-producing *S. aureofaciens*, A-377, soil isolate described in United States patent to Duggar, No. 2,482,055, and deposited at the Northern Regional Research Laboratory, Peoria, Illinois, as NRRL 2209. The new demethyltetracycline-producing strains are derived by treatment of A-377 with mutagenic agents. Cultures of the new demethyltetracycline-producing strains of *S. aureofaciens* are on deposit at the American Type Culture Collection, Washington, D.C., under ATCC Accession Nos. 12,551, 12,552, 12,553 and 12,554.

In the production of demethylchlortetracycline with mutant strains it has been found that quantities of demethyltetracycline, frequently as high as 15–20%, are at times produced even when the medium contains a high level of chloride ions so as to favor the production of demethylchlortetracycline. As in the production of chlortetracycline, the presence of demethyltetracycline also involves difficult problems of separation. Hence, any method that results in the increased production of demethylchlortetracycline and in the lessened production of demethyltetracycline would be of extreme value.

The present invention is based upon the discovery that the addition of D-methionine or 5-fluorouracil in requisite quantities to a chlortetracycline or demethylchlortetracycline fermentation reduces the ratio of the non-halogenated antibiotics produced. Thus the addition of either of these two compounds to such fermentations in small, carefully controlled quantities tends to further the production of chlortetracycline and/or demethylchlortetracycline as the case may be, and to decrease the production of tetracycline and/or demethyltetracycline which are usually produced at the same time. By the addition of either of these compounds to the fermentation at certain definite levels, it has been found that only a relatively small amount of tetracycline or demethyltetracycline, as the case may be, is produced; so little in fact that it becomes unnecessary to effect a separation of these antibiotics from the principal product of the fermentation.

The amount of D-methionine or 5-fluorouracil that is added to the fermentation is a factor of some importance in that an adequate amount of these compounds must be added to effect the desired increase in the production of the halogenated tetracycline antibiotics, and yet above a certain level the compounds are decidedly toxic to the microorganism, and the total antibiotic production falls off.

In general, it has been found that from about 10 to about 2,000 parts per million of D-methionine are useful in both of the fermentations and that from about 1 to about 25 parts per million of 5-fluorouracil are similarly useful in such fermentations.

The conditions of the fermentation are generally the same as for the presently known methods of producing chlortetracycline and demethylchlortetracycline by fermentation. That is, the fermentation medium contains the usual nutrients and mineral substances. Suitable nutrient substances include starch, dextrose, cane sugar, glucose, molasses, cottonseed flour, soybean meal, peanut meal, yeast, meat extracts, peptone, ammonium sulfate, urea, corn steep liquor, distillers' solubles, fish meal and other conventional substances. The inorganic salts include such things as calcium carbonate, ammonium sulfate, ammonium chloride, and the various trace elements such as manganese, cobalt, zinc, copper, iron and the like. Generally, it is preferred to use a medium rich in chloride ion also as higher yields of the chlorinated antibiotics are thereby obtained.

The other general conditions of the fermentation such as hydrogen ion concentration, temperature, time, rate of aeration, preparation of the inoculum, sterilization, inoculation and the like are conventional and may be similar to those for the production of chlortetracycline shown in United States patent to Duggar, No. 2,482,055, and for the production of demethylchlorotetracycline shown in United States patent to McCormick, et al., No. 2,878,289.

So far as the production of chlortetracycline is concerned, this aspect of the present invention is not particularly concerned with any specific microorganisms except to the extent that it s concerned wth those mcroorgansms that produce chlortetracycline and tetracycline by fermentative biosynthesis. Insofar as is presently known, all such microorganisms are of the genus Streptomyces. The species *S. aureofaciens*, which produces chlortetracycline in fermentation media in which chloride ions are present as well as numerous natural and induced mutants is, of course, preferably used and such microorganisms will, of course, also produce tetracycline when deprived of chloride ions. A number of other chlortetracycline-producing microorganisms and tetracycline-producing microorganisms have been mentioned in the patent literature as alleged distinct species of Streptomyces such as *S. viridifaciens, S. sayamaensis, S. feofaciens,* and still others. The published morphological data on these microorganisms is insufficient conclusively to determine whether or not they are new species or merely strains of *S. aureofaciens.* Regardless of this, however, this aspect of the present invention is not predicated upon the selection of a particular species of microorganism so long as that microorganism will produce both chlortetracycline and tetracycline.

With respect to the production of demethylchlortetracycline, selected mutant strains of a demethylchlortetracycline-producing strain of *S. aureofaciens* must, of course, be used and typical strains are described in the aforesaid McCormick et al. patent.

The recovery of the chlortetracycline from the fermentation liquor is conventional and need not be described as numerous methods for recovering chlortetracycline from fermentation liquors have already been published. For recovering demethylchlortetracycline, the recovery procedures described in the aforesaid McCormick et al. patent are preferably used.

The invention will be described in greater detail in conjunction with the following specific examples.

EXAMPLE 1

*Addition of D-Methionine to a Demethylchlortetracycline Fermentation*

A demethylchlortetracycline fermentation medium was prepared as follows:

| | |
|---|---|
| Proflo (defatted, partially cooked cottonseed flour | 45 grams per liter. |
| Starch | 45 grams per liter. |
| Brewers' yeast | 1.5 grams per liter. |
| CaCO$_3$ | 10.5 grams per liter. |
| NH$_4$Cl | 1.5 grams per liter. |
| CuSO$_4$·5H$_2$O | 100 milligrams per liter. |
| Lard oil | 3% v./v. added individually per flask. |

This medium was divided into two equal portions. To one portion D-methionine was added to a concentration of 0.5 gram per liter. Each portion was then dispensed into separate 250 ml. volumetric flasks at the rate of 25 ml. per flask, sterilized and inoculated with a demethylchlortetracycline-producing strain of *S. aureofaciens* (ED-2314). The inoculum was grown in 100 ml. of the following medium per 500 ml. flask over a period of 24 hours at 25° C. and 185 r.p.m. on a 2-inch throw rotary shaker.

| | Grams per liter |
|---|---|
| Corn steep liquor | 20 |
| Sucrose | 30 |
| (NH$_4$)$_2$SO$_4$ | 2 |
| CaCO$_3$ | 7 |

After inoculation the fermentation flasks were incubated at 24° C. on a rotary shaker (2-inch throw, 185 r.p.m.) for a period of 160 hours. At this time, samples were taken and assayed for their demethylchlortetracycline and demethyltetracycline content. The results obtained are reported in the table below.

TABLE 1

| Concentration of D-methionine in fermentation medium | DMCTC,[1] mcg./ml. | DMTC,[2] mcg./ml. | DMTC, percent of total |
|---|---|---|---|
| 0.0 grams per liter | 5,360 | 665 | 12 |
| 0.5 grams per liter | 4,930 | 140 | 3 |

[1] DMCTC=Demethylchlortetracycline.
[2] DMTC=Demethyltetracycline.

EXAMPLE 2

*Addition of D-Methionine to a Demethylchlortetracycline Fermentation Medium at Various Levels*

The procedure of Example 1 was followed except that different concentrations of D-methionine were used in the fermentation medium. The results obtained are reported in the table below.

TABLE 2

| Concentration of D-methionine in gm./l. | DMCTC,* mcg./ml. | DMTC,* mcg./ml. | DMTC, percent of total |
|---|---|---|---|
| 0.0 | 4,260 | 500 | 11 |
| 0.1 | 4,165 | 365 | 8 |
| 0.5 | 3,710 | 210 | 6 |
| 1.0 | 3,720 | 120 | 3 |

*See footnotes 1 and 2, table 1.

EXAMPLE 3

*Addition of D-methionine to a Chlortetracycline Fermentation*

A chlortetracycline fermentation medium was prepared as follows:

| | |
|---|---|
| Corn flour | 14.5 grams per liter. |
| Starch | 47 grams per liter. |
| Corn steep liquor | 25 grams per liter. |
| CaCO$_3$ | 9 grams per liter. |
| (NH$_4$)$_2$SO$_4$ | 5.6 grams per liter. |
| NH$_4$Cl | 1.7 grams per liter. |
| Proflo | 5 grams per liter. |
| Technical MnSO$_4$ | 80 milligrams per liter. |
| CoCl$_2$·5H$_2$O | 5 milligrams per liter. |
| Lard oil | 3% by volume. |

This medium was dispensed at a rate of 25 ml. per 250 ml. volumetric flask. D-methionine was added to these flasks in various concentrations. After sterilization the media were inoculated with a 24-hour old inoculum of a chlortetracycline-producing strain of *S. aureofaciens* (S-77). This inoculum was prepared as described in Example 1 except for the difference in strains, and the inoculum and fermentation medium grown at 26.5° C. The flasks were incubated exactly as described in Example 1 except that the incubation time was 140 hours instead of 160 hours. At this time samples were taken and assayed for their chlortetracycline and tetracycline content. The results obtained are reported in the table below.

TABLE 3

| D-methionine concentration, mg./liter | CTC,[1] mcg./ml. | TC,[2] mcg./ml. | Percent TC |
|---|---|---|---|
| 0 | 8,350 | 715 | 7.9 |
| 25 | 8,350 | 605 | 6.7 |
| 50 | 7,925 | 560 | 6.6 |
| 100 | 3,990 | 160 | 3.8 |
| 200 | 3,155 | 75 | 2.4 |

[1] CTC=Chlortetracycline.  [2] TC=Tetracycline.

EXAMPLE 4

*Addition of D-Methionine to a Chlortetracycline Fermentation*

A chlortetracycline fermentation medium was prepared as follows:

| | |
|---|---|
| Starch | 55 grams per liter. |
| Corn steep liquor | 25 grams per liter. |
| CaCO$_3$ | 9 grams per liter. |
| (NH$_4$)$_2$SO$_4$ | 5 grams per liter. |
| NH$_4$Cl | 1.5 grams per liter. |
| MgCl$_2$·6H$_2$O | 2.0 grams per liter. |
| FeSO$_4$·7H$_2$O | 60 milligrams per liter. |

MnSO$_4$·4H$_2$O _____ 50 milligrams per liter.
ZnSO$_4$·7H$_2$O _____ 100 milligrams per liter.
CoCl$_2$·5H$_2$O _____ 5 milligrams per liter.
Lard oil _____ 2% by volume.

D-methionine was added to portions of this medium at various levels. The sterilized media were inoculated with *S. aureofaciens*, strain S-77. The fermentation, inoculation, and incubation procedures were exactly the same as those described in Example 3 except that the incubation proceeded for 160 hours at 25° C. The results obtained are reported in the table below.

TABLE 4

| D-methionine, mg./liter | Expt. 1 | | | Expt. 2 | | | Expt. 3 | | | Expt. 4 | | | Expt. 5 | | | Expt. 6 | | | Expt. 7 | | | Expt. 8 | | |
|---|---|---|---|---|---|---|---|---|---|---|---|---|---|---|---|---|---|---|---|---|---|---|---|---|
| | Mcg./ml. | | Percent TC | Mcg./ml. | | Percent TC | Mcg./ml. | | Percent TC | Mcg./ml. | | Percent TC | Mcg./ml. | | Percent TC | Mcg./ml. | | Percent TC | Mcg./ml. | | Percent TC | Mcg./ml. | | Percent TC |
| | CTC | TC | | CTC | TC | | CTC | TC | | CTC | TC | | CTC | TC | | CTC | TC | | CTC | TC | | CTC | TC | |
| 0 | 6,200 | 435 | 6.6 | 6,500 | 370 | 5.4 | 6,100 | 610 | 9.1 | 5,800 | 660 | 10.2 | 5,800 | 470 | 7.5 | 5,600 | 445 | 7.3 | 6,000 | 535 | 8.1 | 6,400 | 465 | 6.7 |
| 1 | | | | | | | | | | | | | 5,700 | 465 | 7.5 | | | | | | | | | |
| 5 | | | | | | | | | | | | | 5,650 | 440 | 7.2 | | | | | | | | | |
| 10 | | | | | | | | | | | | | 5,750 | 425 | 6.9 | | | | | | | | | |
| 100 | | | | | | | 5,200 | 390 | 6.9 | | | | 4,850 | 315 | 6.1 | | | | | | | | | |
| 200 | | | | | | | | | | | | | | | | | | | | | | | | |
| 250 | | | | | | | 4,900 | 225 | 4.3 | | | | | | | | | | 5,450 | 250 | 0 | | | |
| 500 | | | | 4,475 | ¹0 | ¹0 | 4,375 | 112 | 2.4 | | | | | | | | | | | | | | | |
| 1,000 | 3,950 | ¹0 | ¹0 | 4,175 | ¹0 | ¹0 | | | | 3,550 | ¹0 | ¹0 | 3,700 | ¹0 | ¹0 | 3,850 | ¹0 | ¹0 | 5,350 | ¹0 | ¹0 | 4,450 | ¹0 | ¹0 |
| 2,000 | 4,250 | ¹0 | ¹0 | 3,900 | ¹0 | ¹0 | | | | | | | | | | | | | | | | 4,150 | ¹0 | ¹0 |

¹ The amount of tetracycline present in these instances was too low to be reliably determined from the differential, instrumental method employed. However, chromatographic assays at these levels have indicated traces of tetracycline.

EXAMPLE 5

*Addition of D-Methionine to a Chlortetracycline Fermentation*

The procedure of Example 4 was repeated with the exception that an inoculum of *S. aureofaciens* (strain S-1055) was used. The results obtained are reported in the table below.

TABLE 5

| D-methionine, mg./liter | CTC, mcg./ml. | TC, mcg./ml. | Percent TC |
|---|---|---|---|
| 0 | 2,925 | 490 | 14.3 |
| 1 | 3,000 | 500 | 14.2 |
| 10 | 3,000 | 500 | 14.3 |
| 100 | 3,250 | 470 | 12.6 |
| 500 | 3,075 | 240 | 7.1 |

EXAMPLE 6

*Addition of 5-Fluorouracil to a Chlortetracycline Fermentation*

The procedure of Example 4 was followed except that 5-fluorouracil was added to portions of the fermentation medium in various amounts instead of the D-methionine. The results obtained are reported in the table below.

TABLE 6

| Concentration of 5-fluorouracil in mcg./ml. | CTC, mcg./ml. | TC, mcg./ml. |
|---|---|---|
| 0 | 7,300 | 415 |
| 1 | 7,450 | 320 |
| 10 | 660-910 | ¹0 |
| 25 | 330 | ¹0 |

¹ The amount of tetracycline present in these instances was too low to be reliably determined from the differential, instrumental method employed. However, chromatographic assays at these levels have indicated traces of tetracycline.

EXAMPLE 7

*Addition of 5-Fluorouracil to a Chlortetracycline Fermentation*

The procedure of Example 6 was repeated using lower amounts of 5-fluorouracil. The results obtained appear in the table below.

TABLE 7

| Concentration of 5-fluorouracil in mcg./ml. | CTC, mcg./ml. | TC, mcg./ml. | Percent TC |
|---|---|---|---|
| 0 | 6,500 | 405 | 5.8 |
| 1.0 | 7,000 | 330 | 4.5 |
| 2.5 | 6,550 | ¹0 | ¹0 |
| 5.0 | 3,800 | ¹0 | ¹0 |

¹ See footnote 1, table 6.

EXAMPLE 8

*Addition of 5-Fluorouracil to a Chlortetracycline Fermentation*

The procedure of Example 5 was followed using *S. aureofaciens*, strain S-1055, with the exception that 5-fluorouracil was added to portions of the fermentation medium in various amounts in place of the D-methionine. The results obtained appear in the table below.

TABLE 8

| Concentration of 5-fluorouracil in mcg./ml. | CTC, mcg./ml. | TC, mcg./ml. | Percent TC |
|---|---|---|---|
| 0 | 2,950 | 505 | 14.6 |
| 1.0 | 2,325 | 335 | 12.6 |
| 1.5 | 2,125 | 300 | 12.4 |
| 2.0 | 2,000 | 165 | 7.7 |
| 5.0 | 1,425 | 0-90 | 0-6.0 |

I claim:

1. The process of producing chlortetracycline by aerobic fermentation of an aqueous fermentation medium with a strain of *Streptomyces aureofaciens* which will produce both chlortetracycline and tetracycline which comprises carrying out the fermentation in the presence of from about 10 to about 1,000 parts per million of D-methionine so as to increase the proportion of chlortetracycline to tetracycline produced.

2. The process of producing chlortetracycline by aerobic fermentation of an aqueous fermentation medium with a strain of *Streptomyces aureofaciens* which will produce both chlortetracycline and tetracycline which comprises carrying out the fermentation in the presence of from about 1 to about 25 parts per million of 5-fluorouracil so as to increase the proportion of chlortetracycline to tetracycline produced.

3. The process of producing demethylchlortetracycline by aerobic fermentation of an aqueous fermentation medium with a strain of *Streptomyces aureofaciens* which will produce both demethylchlortetracycline and demethyltetracycline which comprises carrying out the fermentation in the presence of from about 10 to about 2,000 parts per million of D-methionine so as to increase the proportion of demethylchlortetracycline to demethyltetracycline produced.

4. The process of producing demethylchlortetracycline by aerobic fermentation of an aqueous fermentation medium with a strain of *Streptomyces aureofaciens* which will produce both demethylchlortetracycline and demethyltetracycline which comprises carrying out the fermentation in the presence of from about 1 to about 25 parts per million of 5-fluorouracil so as to increase the proportion of demethylchlortetracycline to demethyltetracycline produced.

References Cited in the file of this patent

UNITED STATES PATENTS

| | | |
|---|---|---|
| 2,563,793 | Moyer | Aug. 7, 1951 |
| 2,734,018 | Minievi | Feb. 7, 1956 |

OTHER REFERENCES

Porter: Bacterial Chemistry and Physiology, 1946, page 749. (Copy in Division 63.)